United States Patent

Kentosh

[11] 4,138,751
[45] Feb. 13, 1979

[54] REMOVABLE FLUID SWIVEL FOR MOORING TERMINALS

[75] Inventor: James M. Kentosh, Los Angeles, Calif.

[73] Assignee: Amtel, Inc., Los Angeles, Calif.

[21] Appl. No.: 788,637

[22] Filed: Apr. 18, 1977

[51] Int. Cl.² ............................................. B63B 21/52
[52] U.S. Cl. ...................................... 9/8 P; 285/136; 114/230
[58] Field of Search .................... 9/8 P; 114/256, 257, 114/230, 165; 285/133 R, 133 A, 134, 136

[56] References Cited

U.S. PATENT DOCUMENTS

| | | | |
|---|---|---|---|
| 2,030,768 | 2/1936 | Schultz | 114/165 |
| 3,082,440 | 3/1963 | Rhedin | 114/230 |
| 3,614,869 | 10/1971 | Flory | 114/230 |
| 3,838,720 | 10/1974 | Van Hulstijn | 285/136 |
| 3,840,927 | 10/1974 | Reid | 114/230 |

Primary Examiner—Trygve M. Blix
Assistant Examiner—D. W. Keen
Attorney, Agent, or Firm—Freilich, Hornbaker, Wasserman, Rosen & Fernandez

[57] ABSTRACT

For the purpose of mooring a vessel in deep water, as well as to load or discharge a fluid cargo from the vessel, mooring terminals consisting of a buoy anchored to the seabed or a column coupled to the bottom are used. Hoses transfer fluid between the vessel and a fluid swivel in the terminal, allowing 360° rotation of the vessel around the terminal. Pipes and/or hoses from the swivel to a sealed pipeline allow fluid transfer between the ship and any desired location. This invention provides a fluid swivel which has a toroidal shape and can be easily removed from a buoy or column for maintenance, or repair, or replacement.

2 Claims, 5 Drawing Figures

REMOVABLE FLUID SWIVEL FOR MOORING TERMINALS

BACKGROUND OF THE INVENTION

This invention relates to systems for providing both mooring facilities as well as fluid product exchange facilities with ships, and more particularly to improvements therein.

In some presently constructed mooring terminals the fluid swivels are placed below the buoy or designed as an integral part of the lower portion of the buoy itself, in order to keep the end of the hoses underwater below the waves, which cause hose damage. Where a column is used for a mooring terminal, the fluid swivel is also maintained underwater for the same reasons. In these arrangements the accessibility of the swivel for the purpose of periodic maintenance or repair is greatly reduced, requiring the removal of the buoy or limiting the number of components that can be replaced. Since the swivels do require occasional repair, the costs of maintenance can be high for these swivel types. While fluid swivels on buoys which support them out of the water are more readily accessible, the buoy cannot be used while a fluid swivel is being repaired.

OBJECTS AND SUMMARY OF THE INVENTION

An object of this invention is to provide a fluid swivel for a mooring arrangement wherein access for service and/or repair is very simply made.

Another object of this invention is the provision of a fluid swivel construction for underwater use with mooring systems wherein removal for maintenance and repair is made much less expensive than heretofore.

A further object of this invention is to provide a novel and useful construction for a fluid swivel for use with a column or buoy wherein a disabled swivel may be removed and replaced with a minimum of down time.

The foregoing and other objects of the invention are achieved by making the fluid swivel construction around a hollow cylinder. The cylinder may be supported on the deck of a buoy above or below water. In either case, the swivel can slide over the column down to the deck of the buoy to its location whether above or underwater. There it can be fastened to the column or to structures on the column or to the deck of the buoy. For maintenance or repair, the fastening means is easily disassembled and the fluid swivel can then be slid back to the surface over the column without any further disturbance of the column or buoy structure. After being repaired or serviced, the fluid swivel is then slid back over the column down to its former location where it is fastened in place. If desired, the fluid swivel which has been removed can be immediately replaced by another, thus minimizing down time of the buoy or column.

DESCRIPTION OF THE PREFERRED EMBODIMENTS

Figure 1:
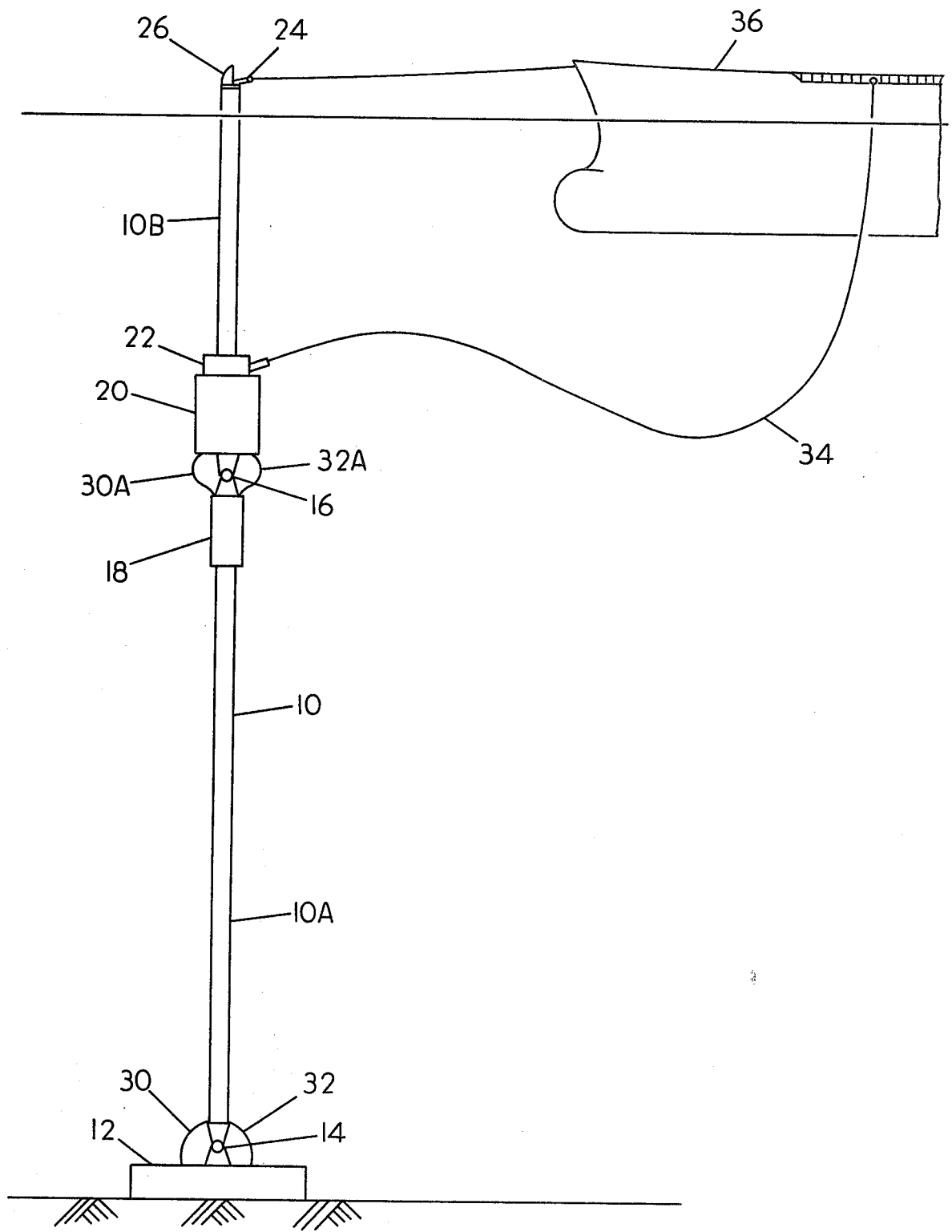
FIG. 1 is an illustration of a fluid swivel in accordance with this invention in place on a mooring column.

FIG. 1 illustrates how the embodiment of the invention appears when located in place. A column 10 may have two portions, a riser portion, 10A, and a buoy portion, 10B. When hooked together, riser and the buoy portions extend from the bottom of the ocean to above the surface. At the bottom there are suitable mooring means 12, to which the section 10A is connected by a suitable swiveling coupling 14 which enables the column to pivot about in response to forces of the ocean as well as of the ship which is moored thereto. Another swiveling coupling 16 is provided between the upper and lower sections of the column.

Just below the coupling 16, a buoyancy chamber 18 is positioned to maintain the section of the column 10A upright. Just above the coupling 16, another buoy 20, is placed which assists in maintaining the entire column upright. Attached to the top of the buoy is a fluid swivel 22, in accordance with this invention. At the top of the column there is provided the usual mooring structure 24 as well as warning lights 26.

Fluid product hoses, respectively 30, 32, which can extend from the shore along the sea bottom, bridge the coupling 14 and extend through the column portion 10A and the buoy 18 to another bridging portion, 30A, 32A. Then the hoses extend up through the buoy 20 to the fluid swivel 22. The fluid swivel has hoses, represented by hose 34, connected between it and a vessel, 36. The vessel is moored to the top of the buoy portion of the column.

Mooring terminals of the type described are well known. In some variations, the lower riser portion, 10A, is replaced by an anchoring chain, or anchoring chains.

Figure 2:
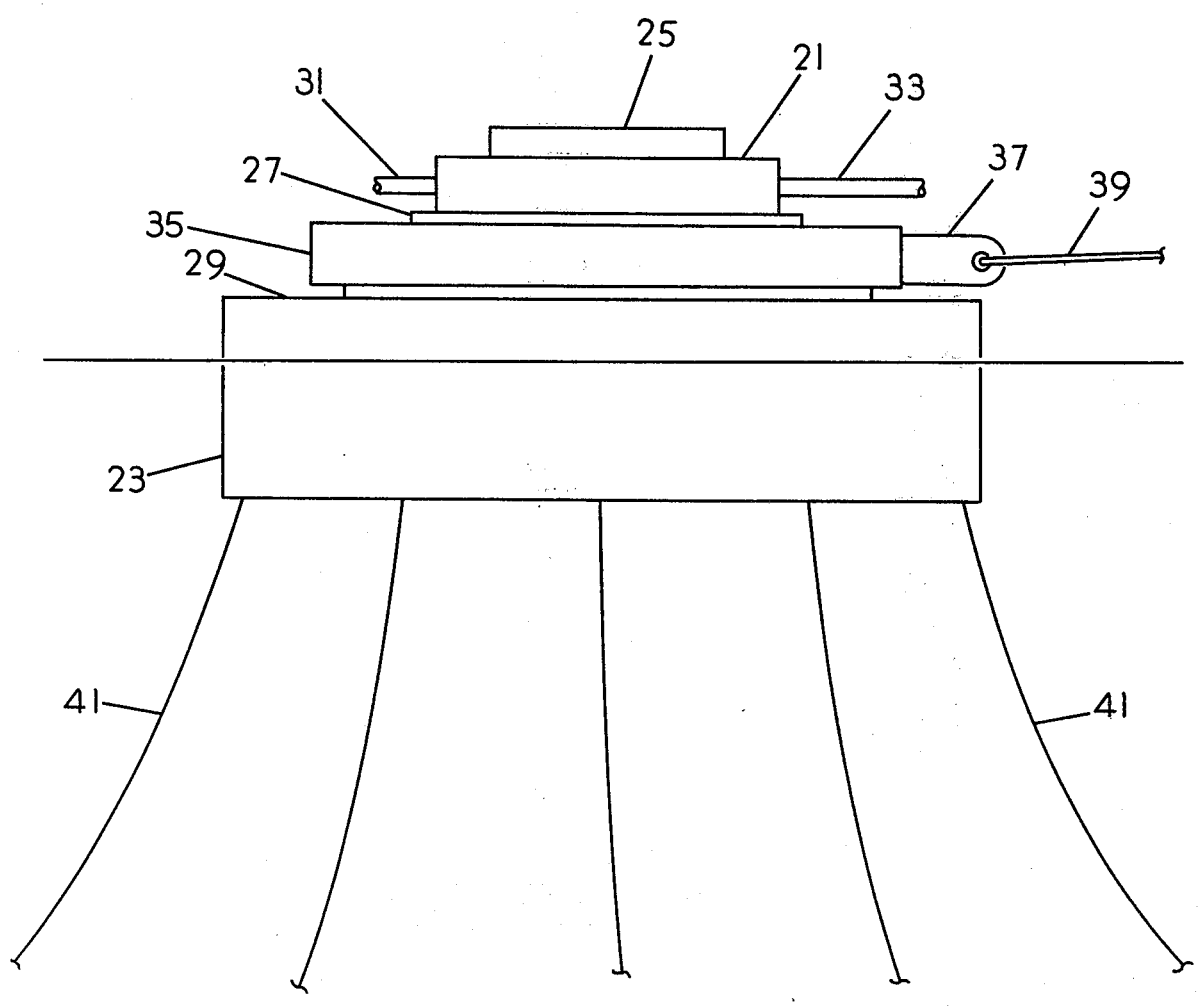
FIG. 2 is an illustration of a fluid swivel, in accordance with this invention in place on a mooring buoy.

FIG. 2 is a view illustrating how a fluid swivel 21, in accordance with this invention would be situated on floating buoy 23. The fluid swivel slides over a column 25 which is fastened to an upper deck 27. The fluid swivel is also removably fastened to the upper deck. The upper deck is fastened to the main deck 29 of the buoy. Hoses 31, 33 extend from the fluid swivel, which is rotatable, to a vessel, not shown. A turntable 35 rotates about the regular deck of the buoy and has a coupling member 37 for enabling a hawser 39 to be fastened thereto for mooring a vessel. The buoy is anchored to the seafloor by a suitable means, such as chains 41.

Figure 3:
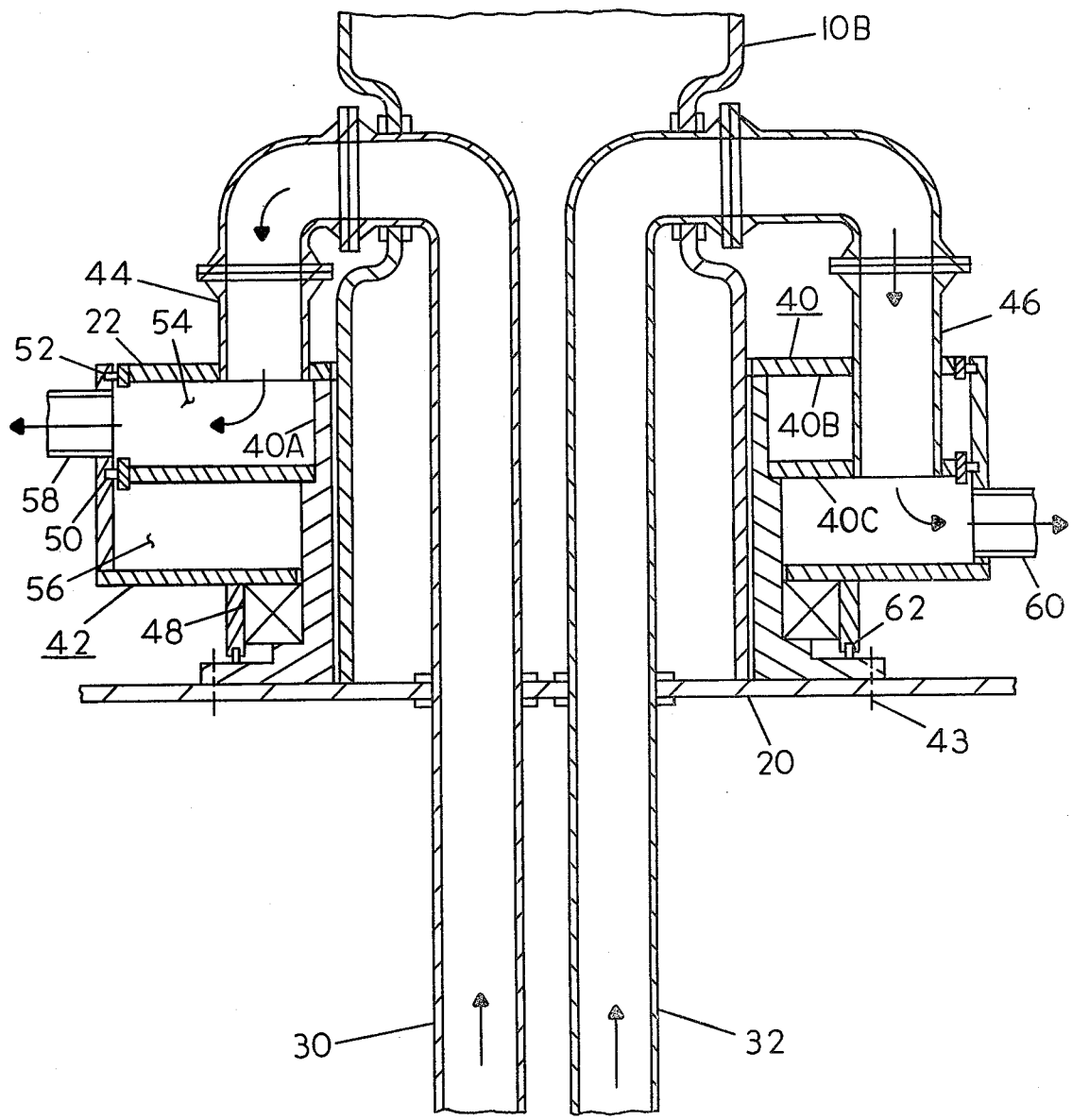
FIG. 3 is a cross sectional view of a multigrade fluid swivel in accordance with this invention.

Referring now to FIG. 3, there may be seen a cross sectional view of an embodiment of the invention suitable for use with the column of FIG. 1 or the buoy of FIG. 2. The fluid swivel has a circular construction, with a central opening large enough so that it can slide over the buoy portion 10B or column 25 down to the top of the buoy 20 or 27. There, it may be removably fastened, for example, by bolts, 43 so that it is held firmly in place and yet can be easily removed when required.

The two grade swivel shown in FIG. 3 has a circular fixed wall portion 40 and circular rotating wall portion 42. The fixed wall portion includes a vertical central cylindrical wall member 40A with a flange at one end for fastening to the deck and two other wall members 40B, 40C which are spaced apart and extend outwardly at right angles from the central cylindrical wall member. The rotating wall portion 42 has a right angle shape in cross section and is fitted to the fixed wall portion to establish an upper and lower fluid chamber respectively 54, 56. The rotating wall portion 42 rotates around the fixed wall portion on a large bearing 48 and on three smaller rotating seals 50, 52 and 62.

The bearings and seals are of the type which permit rotation and yet act as a seal.

An inlet pipe 44 in the fixed wall portion connects to the chamber 54, and an inlet pipe 46 in the fixed wall portion connects to the chamber 56. An outlet pipe 58 in the rotating wall portions, connects the hose, extending from a ship into the chamber 54. Another outlet pipe 60 in the rotating wall portion, connects a hose, which extends to a ship, when it is present, to the chamber 56.

The two outlet pipes, 58, 60 rotate with the rotating wall portion 42 of the fluid swivel. It should be noted that the end of the rotating wall portion which abuts the fixed portion adjacent to the bearing 48 has a rotating seal 62.

From the foregoing it will be seen that the fluid bearing construction, in essence, comprises a hollow cylinder, having an inner diameter large enough to slide over a cylinder with wall extensions from the cylinder together with a rotating wall forming fluid chambers. Entrance to these chambers is through the fixed wall extensions and exit is through the rotating wall.

Whenever maintenance or repairs are needed to the fluid swivel, it is very easily disconnected from the top deck of the buoy and lifted away without disturbing any other part of the column or buoy. Also, hoses wear out. For disconnecting the hose from the fluid swivel, it is a simple matter of raising the fluid swivel, when it is underwater, above the water to perform the necessary decoupling of the old hose and coupling of the new hose to the outlet pipes.

If desired the removed fluid swivel can be immediately replaced with another, thus avoiding unnecessary downtime.

Figure 4:
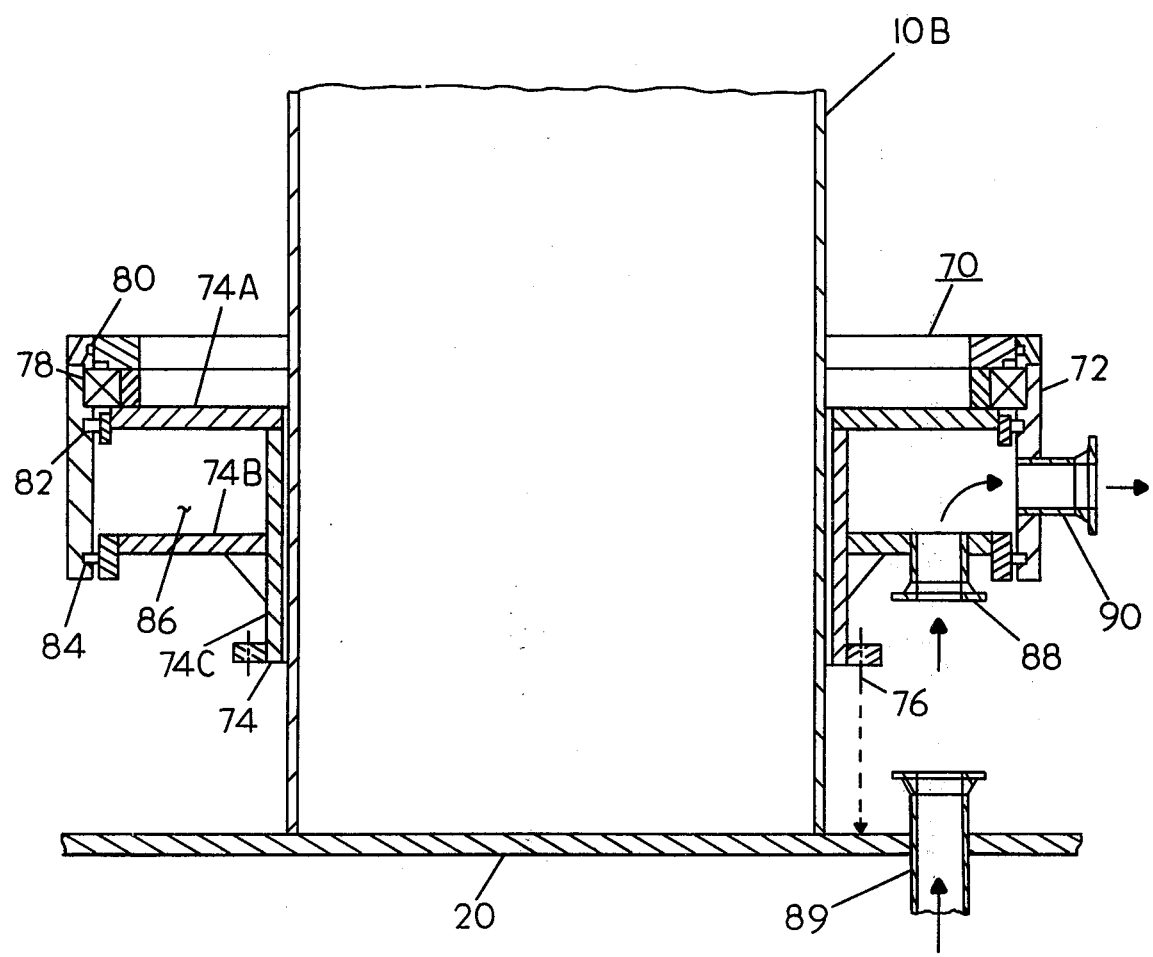
FIG. 4 is a cross sectional view of a single product fluid swivel in accordance with this invention.

FIG. 4 is a cross sectional view of a single product swivel, 70, which can slide over the cylindrical structure such as is previously shown. It is mounted on the deck of the buoy, in the manner shown in FIG. 1 or FIG. 2. The single product swivel 70 has an outer wall 72 which is rotatable around an inner wall portion 74, which is stationary and which is attached, as by bolts 76, to the top deck of the buoy 20. A bearing 78, as well as three rotating type seals 80, 82, and 84 enable the outer wall to rotate.

The spaced wall members 74A, 74B which extend at right angles from the central cylindrical wall member 74C together with the rotating wall 72 define a chamber 86. An inlet pipe 88, introduces product into the chamber. It may be connected by an inlet pipe flange 89 to pipes which extend through the buoy. A hose may be connected to this inlet pipe from the buoy. An outlet pipe 90, which passes through the rotatable outer wall connects the interior of the chamber 86 to the hose which is connected to the ship 36. As the ship moves around the tower under the influence of the wind and tide, the outer wall 72 is rotated therewith to keep the hoses connected between the swivel and the ship.

Here again, in essence, the fluid swivel comprises a hollow cylinder with fixed walls extending outwardly to form a chamber with a wall which is rotatable at the ends of the fixed walls.

Figure 5:
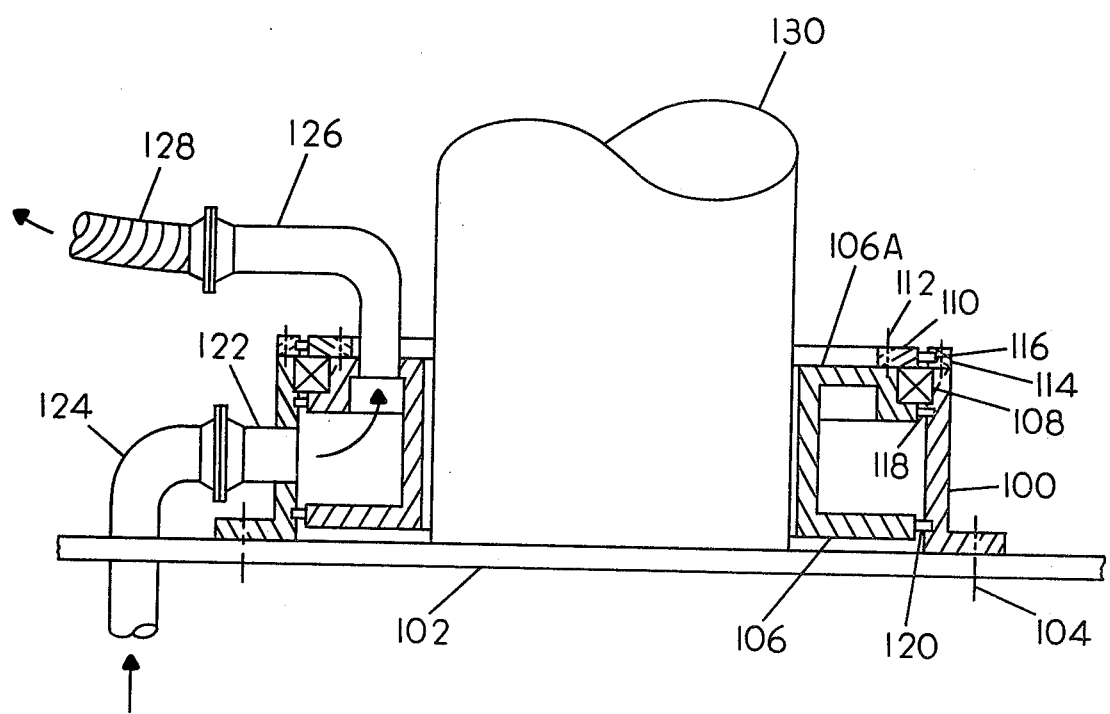
FIG. 5 is a cross sectional view of another embodiment of a fluid product swivel in accordance with this invention.

FIG. 5 is a cross sectional view of another embodiment of a removable fluid swivel, in accordance with this invention. In the previous embodiments of the invention, the inside wall of the swivel was fixed and the outside wall was rotatable. The same annular construction for the fluid swivel is used. Here the outer wall 100 which is in the form of a cylinder, is fixed. It is removably fastened to the deck 102 of the buoy by bolts 104. The circular fluid chamber of the swivel is completed by walls 106, which in cross section are in the shape of a U. The end of the upper wall 106A of the walls 106, in cross section, has the shape of an L, to form a pocket with the fixed wall, in which a bearing 108 is placed. The pocket is closed on top by a flat ring 110, fastened to the wall 106A by bolts 112. The flat ring 110 and another ring 114 fastened to the top of wall 100, have a rotary seal 116 therebetween. Two other rotary seals, respectively 118 and 120 are placed between the fixed and rotary walls.

An input pipe 122 is used to connect a pipe or hose 124, which may come through the buoy, to the swivel chamber. An output pipe 126, which rotates with walls 106, is used to connect the hose 128 which extends to a ship, to the interior of the chamber. The fluid swivel fits over the column 130.

While the fluid swivel, with column sliding capability in one arrangement is described as being fastened to the upper part of a buoy which is permanently located under water, it is within the scope of this invention to support the fluid swivel on a donut shape buoy which also can slide up or down the column. Provision can be made to control the buoyancy of this donut shaped buoy by flooding or emptying sea water therefrom. The fluid swivel can be attached to this buoy and both the swivel and the buoy can be floated down to the top of the permanent buoy and attached thereto. Then, when it is desired to repair or service the fluid swivel, all that is necessary is to decouple the hoses from the fluid swivel. Then the buoy to which the swivel is attached is disconnected from the permanent buoy. The donut shaped buoy can then be made buoyant by pumping out the water which was introduced to reduce its buoyancy, whereby the fluid swivel can be floated up to the top.

There has accordingly been described and shown herein a novel and useful structional arrangement for a fluid product swivel which has a toroidal shape to afford easy removal and replacement on a mooring terminal whether underwater or on the surface.

I claim:

1. In an arrangement wherein a mooring terminal comprising a column means extends from under the sea above the surface to provide ship mooring facilities at the surface, and said terminal supports a fluid swivel below the surface of the ocean whereby product may be brought to or taken from said ship, an improved fluid swivel comprising:

a fluid swivel having stationary wall means and rotatable wall means rotatably sealed to one another and defining therebetween a hollow chamber;

one of said wall means including an inner wall in the form of a hollow cylinder having an inner diameter sufficiently large to be able to slide over said column means to a predetermined location below the surface of the ocean;

a first pipe connected to said chamber through the stationary wall means of said fluid swivel;

a second pipe connected to said chamber through the movable wall means of said fluid swivel; and means for releasably fastening said fluid swivel to said column means at said predetermined location;

said inner wall in the form of a hollow chamber forming a wide hole which is wider than substantially any obstruction above it along said column means to the surface of the sea, so that said fluid swivel can be directly lifted to the surface of the sea along said column means when said fastening means is released.

2. In a mooring terminal for lying in a body of water and mooring a ship, the improvement comprising:

a column extending from the bed of the body of water to the surface thereof and having a mooring structure near the water surface for attaching to a ship;

a fluid swivel unit with a hollow center, disposed along said column and below the water surface, including a stationary portion removably fixed to said column and a rotatable portion rotatable about a substantially vertical axis on said stationary portion, with each swivel unit portion having a hose coupling;

said column devoid of an obstruction to the lifting of said fluid swivel unit to the surface of the body of water, to facilitate maintenance of the unit, but said column including a tall hollow body of smaller outside diameter than the hollow center of the swivel unit and extending along a portion of the column normally lying above said swivel unit, to pass the swivel unit and yet to provide buoyancy for the column to help keep it substantially vertically oriented.

* * * * *